C. A. WILEY.
HOLDER FOR FENCES OF POULTRY OR OTHER STOCK YARDS.
APPLICATION FILED APR. 16, 1909.
934,779.
Patented Sept. 21, 1909.
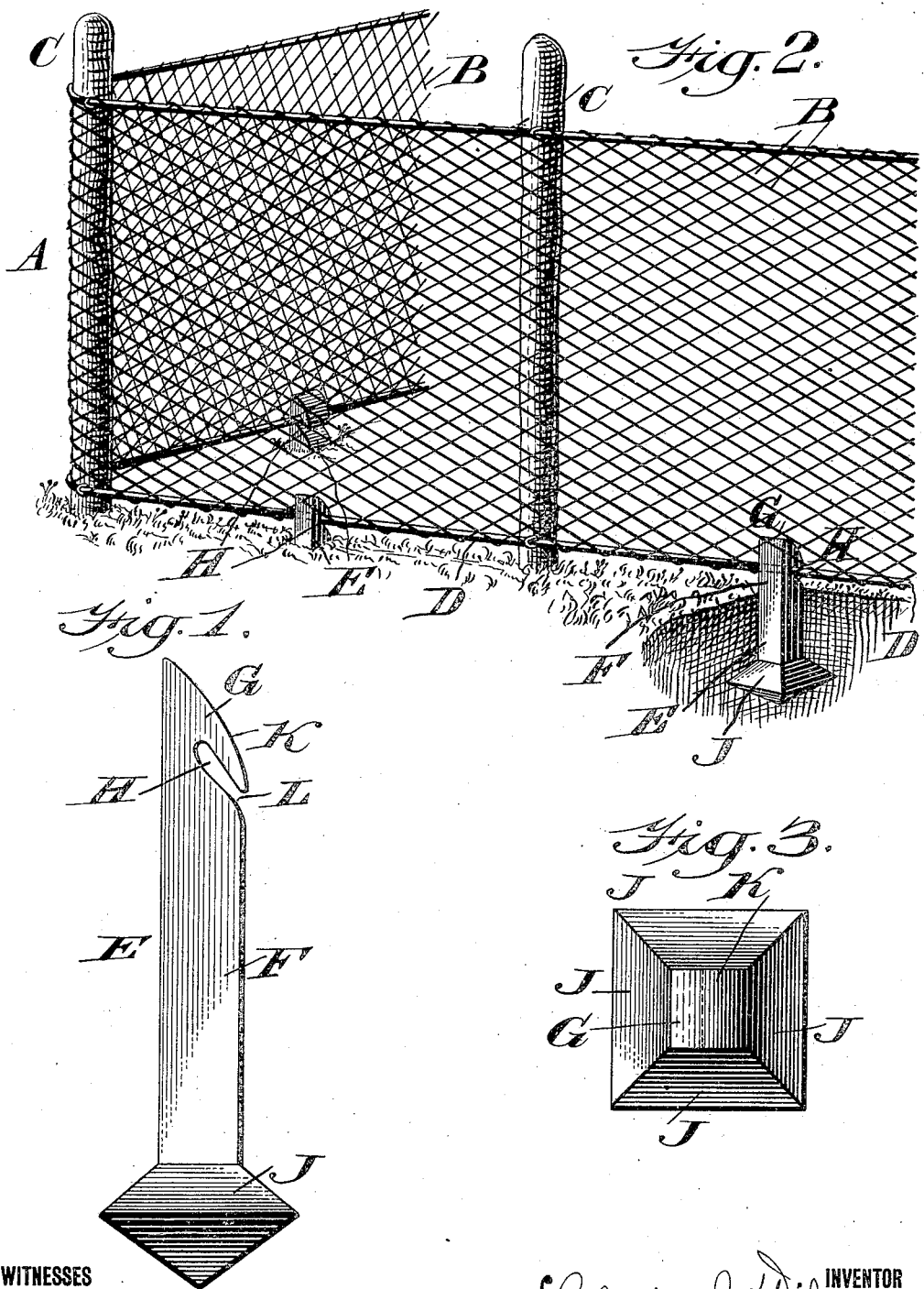
WITNESSES
INVENTOR
Charles A. Wiley
BY
ATTORNEYS

UNITED STATES PATENT OFFICE.

CHARLES A. WILEY, OF MORTON, PENNSYLVANIA, ASSIGNOR OF ONE-HALF TO GEORGE WÜSTNER, OF PHILADELPHIA, PENNSYLVANIA.

HOLDER FOR FENCES OF POULTRY OR OTHER STOCK YARDS.

934,779.

Specification of Letters Patent. Patented Sept. 21, 1909.

Application filed April 16, 1909. Serial No. 490,246.

*To all whom it may concern:*

Be it known that I, CHARLES A. WILEY, a citizen of the United States, residing at Morton, county of Delaware, State of Pennsylvania, have invented a new and useful Holder for Fences of Poultry or other Stock Yards, of which the following is a specification.

My invention consists of a holder for the stringer or lower portion of a fence of a poultry or other stock yard, whereby said stringer or portion is prevented from being raised, so that the poultry or stock cannot escape under the stringer or fence, the stringer being reliably held in place and the employment of boards to close the bottom of such fence is avoided, provision being also made for reliably anchoring the holder firmly in the ground in upright position, all as will be hereinafter set forth, the novel features being pointed out in the claims.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a perspective view of a holder embodying my invention. Fig. 2 represents a perspective view of a fence and such holder in position thereon. Fig. 3 represents a top view of the holder.

Similar letters of reference indicate corresponding parts in the figures.

Referring to the drawing:—A designates a portion of the fence of a poultry or other stock yard composed of the netting B and posts C, with which latter said netting is connected in usual manner.

D designates the lower wire or stringer of the netting, the same being just above the ground and generally hanging loosely, whereby poultry or other stock is enabled often to raise the same and thus escape from the yard. To prevent this, I employ the pin or stake E, which is composed of the shank F, the head G, the throat H below said head, and the anchor J on the lower end of said shank. The head is adapted to be hooked upon the stringer D, and thus hold the portion A of the fence taut and prevent rising thereof. The upper face of said head slopes as at K from the top downwardly to the inlet L of the throat H, which latter extends inclined upwardly into the shank beneath said head to the center of the shank, said inlet L being at the lower terminal of the head G. The anchor J is bulbous, preferably of doubly pyramidal form, or of the form of a plurality of pyramids, one of which is inverted, and the pyramids being united at their bases, it being seen that when the pin is driven into the ground, the anchor is securely seated therein, its faces serving to resist the upward draft or strain to which it may be subjected by the swaying or draft of the portion A of the fence with which the head of the pin is connected, it being seen that said head may be hooked upon the stringer D as the pin is driven into the ground, or when said pin is in position, said stringer may be drawn down over the sloping face of the head until it reaches the inlet L of the throat H, when it ascends the latter and seats itself at the top thereof, centered in the shank so that the pin is not subjected to any side pull which otherwise would draw its upright position, it being evident that the stringer is controlled by the head G of the pin, thus retaining the fence close to the ground and preventing rising of the stringer, so that the latter provides a reliable barrier to the escape of the poultry or other stock at the bottom of the fence. Should the fence and consequently the stringer sag, even to a material extent, the stringer will be prevented from escaping from the throat H, as the lower end or nose of the head G acts as a guard to said throat at the inlet L thereof and the stringer would be required to traverse the entire extent of said throat to the side of the shank before it would be enabled to clear said end or nose of the head, the effect of which is evident.

Owing to the pyramidal form of the anchor, it presents a point to the ground, permitting of the same being driven thereinto. Then the earth closes around the upper faces of the anchor and holds down the latter and resists the rising of the same, whereby the pin or stake retains its position firmly embedded in the ground.

Having thus described my invention, what I claim as new and desire to secure by Letters Patent, is:—

1. The improved pin herein described comprising a shank, having a head and an upwardly inclined throat extending into the center of the shank beneath the head to seat a wire and center it in the shank, the upper face of the head being rounded and downwardly inclined, the inlet to said throat being at the lower terminal of said head, and an anchor on the opposite end of said shank.

2. A pin of the character stated for the purpose described comprising in a single integral element a shank, a head at one end thereof, said shank being formed with an upwardly inclined throat having its inlet at the lower terminal of said head, said throat extending into the center of the shank beneath the head to seat a wire and center it in the shank, the head being downwardly inclined, and an anchor at the opposite end of the shank, said anchor being of double pyramidal form with the bases of the pyramids abutting.

CHARLES A. WILEY.

Witnesses:
GEORGE WÜSTNER,
HARRY C. DALTON.